US009313321B2

(12) United States Patent
Zeng et al.

(10) Patent No.: US 9,313,321 B2
(45) Date of Patent: Apr. 12, 2016

(54) SCREEN UNLOCKING METHOD AND DEVICE FOR MOBILE TERMINAL

(71) Applicant: TENCENT TECHNOLOGY (SHENZHEN) COMPANY LIMITED, Shenzhen, Guangdong (CN)

(72) Inventors: Liang Zeng, Shenzhen (CN); Jun Xue, Shenzhen (CN); Lei Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/615,446

(22) Filed: Feb. 6, 2015

(65) Prior Publication Data

US 2015/0156313 A1 Jun. 4, 2015

Related U.S. Application Data

(63) Continuation of application No. PCT/CN2013/080516, filed on Jul. 31, 2013.

(30) Foreign Application Priority Data

Sep. 13, 2012 (CN) .......................... 2012 1 0338455

(51) Int. Cl.
*H04M 1/66* (2006.01)
*H04M 1/725* (2006.01)
(Continued)

(52) U.S. Cl.
CPC ......... *H04M 1/72577* (2013.01); *G06F 3/0488* (2013.01); *G06F 3/04817* (2013.01);
(Continued)

(58) Field of Classification Search
CPC ... H04M 1/67; H04M 1/673; H04M 1/72577; H04M 2250/22; G06F 3/0488; G06F 3/04817; G06F 3/04842
USPC ............................... 455/411, 418, 550.1, 566
See application file for complete search history.

(56) References Cited

U.S. PATENT DOCUMENTS 7,934,156 B2 * 4/2011 Forstall ............... G06F 3/04883
345/169
2007/0150842 A1 * 6/2007 Chaudhri ............ G06F 3/04883
715/863

(Continued)

FOREIGN PATENT DOCUMENTS

CN 102637105 A 8/2012

OTHER PUBLICATIONS

International Search Report of PCT Patent Application No. PCT/CN2013/080516 issued on Oct. 24, 2013.

*Primary Examiner* — Khai M Nguyen

(57) ABSTRACT

A screen unlocking method for a mobile terminal, includes: providing an icon on the touch screen that indicates the mobile terminal is in a lock state; receiving an input event of a user on the touch screen, the input event comprising a rotating operation on the icon; detecting whether a rotating angle of the icon equals a unlocking angle preset in a storage system of the mobile terminal; and transitioning the mobile terminal from the lock state to an unlock state upon the condition that the rotating angle equals the unlocking angle. In the screen unlocking method and device for a mobile terminal, the shape, position, and direction of the unlocking identification are allowed to be set according to requirements from different users, thereby meeting users' personalized needs and enriching users' visual effects; in addition, the unlocking angle can be set by users, which improves user experience.

16 Claims, 5 Drawing Sheets

(51) Int. Cl.
*H04M 1/67* (2006.01)
*G06F 3/0481* (2013.01)
*G06F 3/0484* (2013.01)
*G06F 3/0488* (2013.01)
*H04M 1/673* (2006.01)

(52) U.S. Cl.
CPC ............ *G06F3/04842* (2013.01); *H04M 1/67* (2013.01); *H04M 1/673* (2013.01); *H04M 2250/22* (2013.01)

(56) References Cited

U.S. PATENT DOCUMENTS

| | | | | | |
|---|---|---|---|---|---|
| 2008/0052945 | A1* | 3/2008 | Matas | ................... | G06F 3/0485 34/173 |
| 2008/0220752 | A1* | 9/2008 | Forstall | ................... | H04M 1/56 455/415 |
| 2010/0225607 | A1* | 9/2010 | Kim | ........................ | G06F 3/042 345/173 |
| 2011/0300831 | A1* | 12/2011 | Chin | ..................... | G06F 1/3203 455/411 |
| 2013/0053105 | A1* | 2/2013 | Lee | ........................ | H04M 1/673 455/565 |
| 2013/0055169 | A1* | 2/2013 | Wright | ................... | H04M 1/67 715/863 |
| 2013/0091468 | A1* | 4/2013 | Xie | ........................ | H04M 1/67 715/835 |
| 2013/0094770 | A1* | 4/2013 | Lee | ........................ | G06F 21/36 382/218 |

* cited by examiner

SCREEN UNLOCKING METHOD AND DEVICE FOR MOBILE TERMINAL

CROSS-REFERENCE TO RELATED APPLICATIONS

This application is a Continuation Application of PCT application No. PCT/CN2013/080516 filed on Jul. 31, 2013, which claims the benefit of Chinese Patent Application No. 201210338455.5, entitled "Screen Unlocking Method and Device for Mobile Terminal", filed by TENCENT TECHNOLOGY (SHENZHEN) COMPANY LIMITED on Sep. 13, 2012; the contents of which are hereby incorporated by reference.

FIELD OF THE TECHNOLOGY

The present disclosure relates to mobile terminal technical field, and more particularly, to a screen unlocking method and device for a mobile terminal.

BACKGROUND OF THE DISCLOSURE

With the development of the mobile terminal technology, touch-screen mobile phones are especially popular among young people due to features including powerful functions and fashionable looks. Unlocking mobile phone is a necessary action of a mobile phone user every day after she/he picks up the mobile phone. At present, in an unlocking method of a touch-screen device like an iPad, an iPhone and an android mobile phone, a moving slider at the bottom of the screen is slid to unlock the screen, as specifically shown FIG. 1, which is a schematic view of an existing unlocking screen of a touch-screen mobile phone. The defect of the unlocking method is that the slider can only slide along a preset direction following a pattern, and the sliding direction can't be changed based on users' individualize needs, thus, user experience is affected.

SUMMARY

An aspect of the present disclosure provides a new screen unlocking method and device for a mobile terminal.

A screen unlocking method for unlocking a touch screen of a mobile terminal, including:

at the mobile terminal having one or more processors and memory for storing program modules to be executed by the processors:

providing an icon on the touch screen that indicates the mobile terminal is in a lock state;

receiving an input event of a user on the touch screen, the input event including a rotating operation on the icon;

detecting whether a rotating angle of the icon equals a unlocking angle preset in a storage system of the mobile terminal; and transitioning the mobile terminal from the lock state to an unlock state upon the condition that the rotating angle equals the unlocking angle.

A screen unlocking device for a mobile terminal, including:

an unlock processing module configured for receiving an input event of a user on the touch screen, the input event including a rotating operation on the icon;

an unlock judging module configured for detecting whether a rotating angle of the icon equals a unlocking angle preset in a storage system of the mobile terminal; and a screen unlocking module configured for transitioning the mobile terminal from the lock state to an unlock state upon the condition that the rotating angle equals the unlocking angle.

In the screen unlocking method and device for a mobile terminal provided in the present disclosure, the shape, position, and direction of the unlocking identification are allowed to be set according to requirements from different users, thereby meeting users' personalized needs and enriching users' visual effects; in addition, the unlocking angle can be set by users, when the rotating angle of the unlocking identification does not reach the unlocking angle, the unlocking identification can rebound to the close previous degree or rotate to the close next degree in the form of animation, which is beneficial to improve a sensitivity of the screen unlocking operation and user experience.

The above description is a summary of the technical solutions of the present invention. In order to better understand the technical means of the present invention, to implement the present invention according to the content of the specification, and to make the above and other objects, features, and advantages of the present invention more easily understood, specific embodiments are described in detail below in connection with the accompanying drawings.

DETAILED DESCRIPTION OF THE INVENTION

In order to further illustrate technical method taken for achieving the intended purpose of the present invention and to illustrate advantages of the present technical method, embodiments, methods, steps, and advantages of a screen unlocking method and device for a mobile terminal are described in more detail below with reference to the accompanying drawings and the preferred embodiments.

What's mentioned above and other technical method, features, and advantages of the present invention will become clearer in the specific description of the preferred embodiments combined with the accompanying drawings. By way of the embodiments, the technical means taken for achieving the intended purpose of the present invention and the advantages thereof can be understood in a more in-depth and detailed way, however, it will be appreciated that the accompanying drawings are only for reference and illustration and are not intended to limit the present invention.

Figure 1:
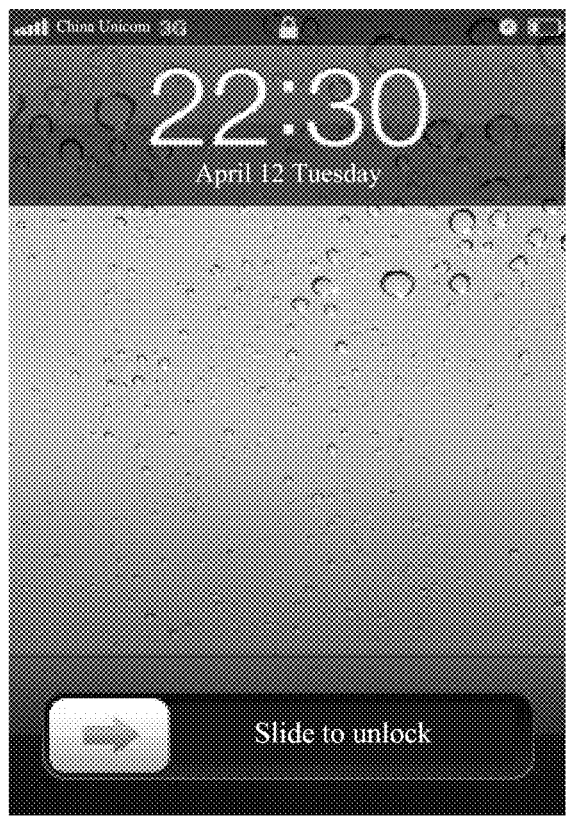
FIG. 1 is a schematic view of an existing unlocking screen of a touch-screen mobile phone.
Figure 2:
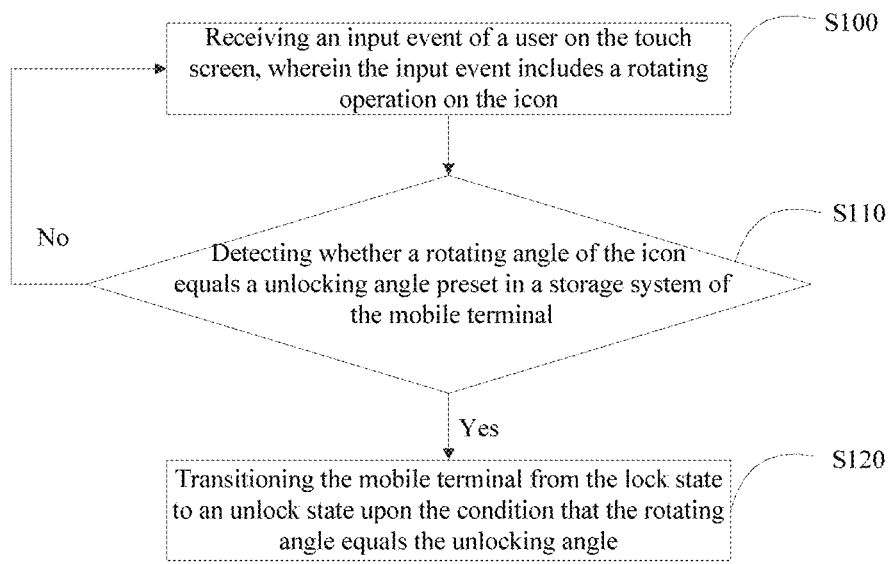
FIG. 2 is a flow chart of a screen unlocking method for a mobile terminal according to a first embodiment of the present disclosure.

FIG. 2 is a flow chart of a screen unlocking method for a mobile terminal according to a first embodiment of the present disclosure. Referring to FIG. 2, a screen unlocking method for a mobile terminal in a first embodiment of the present disclosure includes steps as follows.

Step S100, receiving an input event of a user on the touch screen wherein the input event includes a rotating operation on an icon. In the embodiment, the icon on the touch screen may indicate that the mobile terminal is in a lock state.

Figure 3:
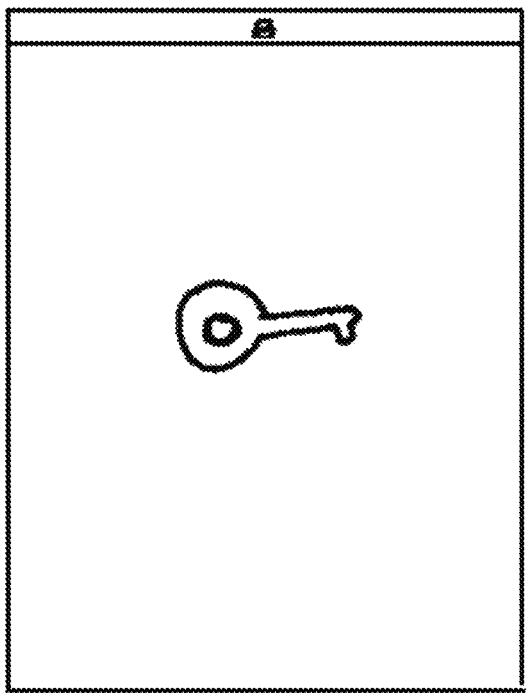
FIG. 3 is an effect chart showing that a screen of the mobile terminal is in a lock state.
Figure 4:
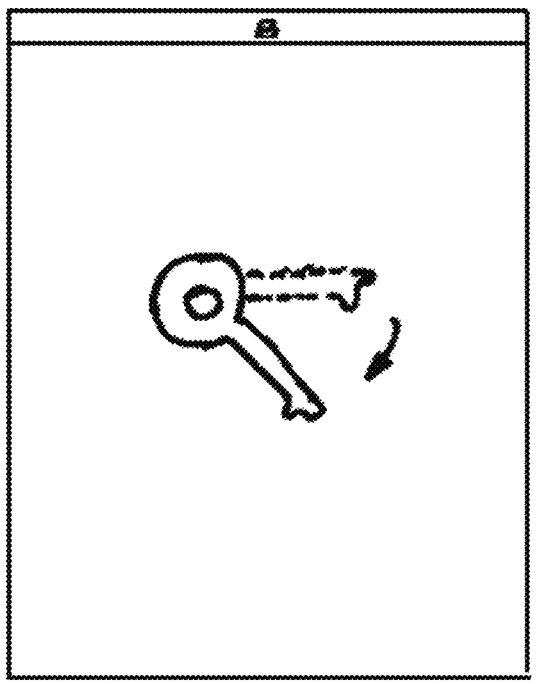
FIG. 4 is an effect chart showing rotation of an icon of the screen of the mobile terminal.

In step S100, users can unlock the screen by rotating the icon according to set unlocking information; a shape, position, direction, and rotating direction of the icon can be set according to requirements from different users, thereby meeting users' personalized needs and enriching users' visual effects. In the embodiment of the present disclosure, the icon has a key shape and is set in the middle of the screen, an end of the key keeps horizontal and faces rightwards, and the rotating direction of the icon is clockwise; when the screen is locked, an angle between the end of the key and the horizontal direction is recorded as 0 degree, as specifically shown in FIGS. 3 and 4, in which FIG. 3 is an effect chart showing that a screen of the mobile terminal is in a lock state and FIG. 4 is an effect chart showing rotation of an icon of the screen of the mobile terminal.

Step S110, detecting whether a rotating angle of the icon equals an unlocking angle preset in a storage system of the mobile terminal, if the rotating angle equals the unlocking angle, performing step S120; if the rotating angle does not equal the unlocking angle, repeating step S100.

In step S110, after a user gesture of rotating the key stops, the rotating angle between a stop position and a start position of the icon is only fixed at an integral multiple of 90 degrees such as 0 degree, 90 degrees, 180 degrees and 270 degrees. If the rotating angle does not reach an integral multiple of 90 degrees, the icon rebounds to a closer previous angle or rotates to a closer next angle in the form of animation according to the nearby principle, which is beneficial to improve a sensitivity of the screen unlocking operation and user experience thereof. For example, if the user gesture rotates the key over 78 degrees, the key stops at the 90-degree position finally, and if the user gesture rotates the key over 178 degrees, the key stops at the 180-degree position finally. Wherein, the animation needs the acceleration effect from gravity sensor. The unlocking angle can be set to be an integral multiple of 90 degrees angles such as 90 degrees, 180 degrees, and 270 degrees according to requirements from users. If the unlocking angle is N degrees more than 360 degrees, users should make N/360 turns of the icon and then set the position of the N %360-degree angle is set as the unlocking position. In the embodiment of the present disclosure, the default unlocking angle is 90 degrees. It can be understood that the present disclosure not only can be applied to the screen unlocking function, but also can be applied to other functions which need unlocking operations, for example, answering a call. Users can set different unlocking information corresponding to different unlocking functions.

Step S120, transitioning the mobile terminal from the lock state to an unlock state upon the condition that the rotating angle equals the unlocking angle.

In some embodiments, the screen unlocking method for a mobile terminal may further include a step of displaying a small lock in a lock state indicating that the mobile terminal is in the lock state in the middle of the top status bar, as shown from FIG. 1 to FIG. 4. In step S120, after the screen is successfully unlocked, the small lock is displayed in an open state indicating that the mobile terminal is in the unlock state, as specifically shown in FIG. 5, which is an effect chart showing that the screen of the mobile terminal is successfully unlocked.

Figure 6:
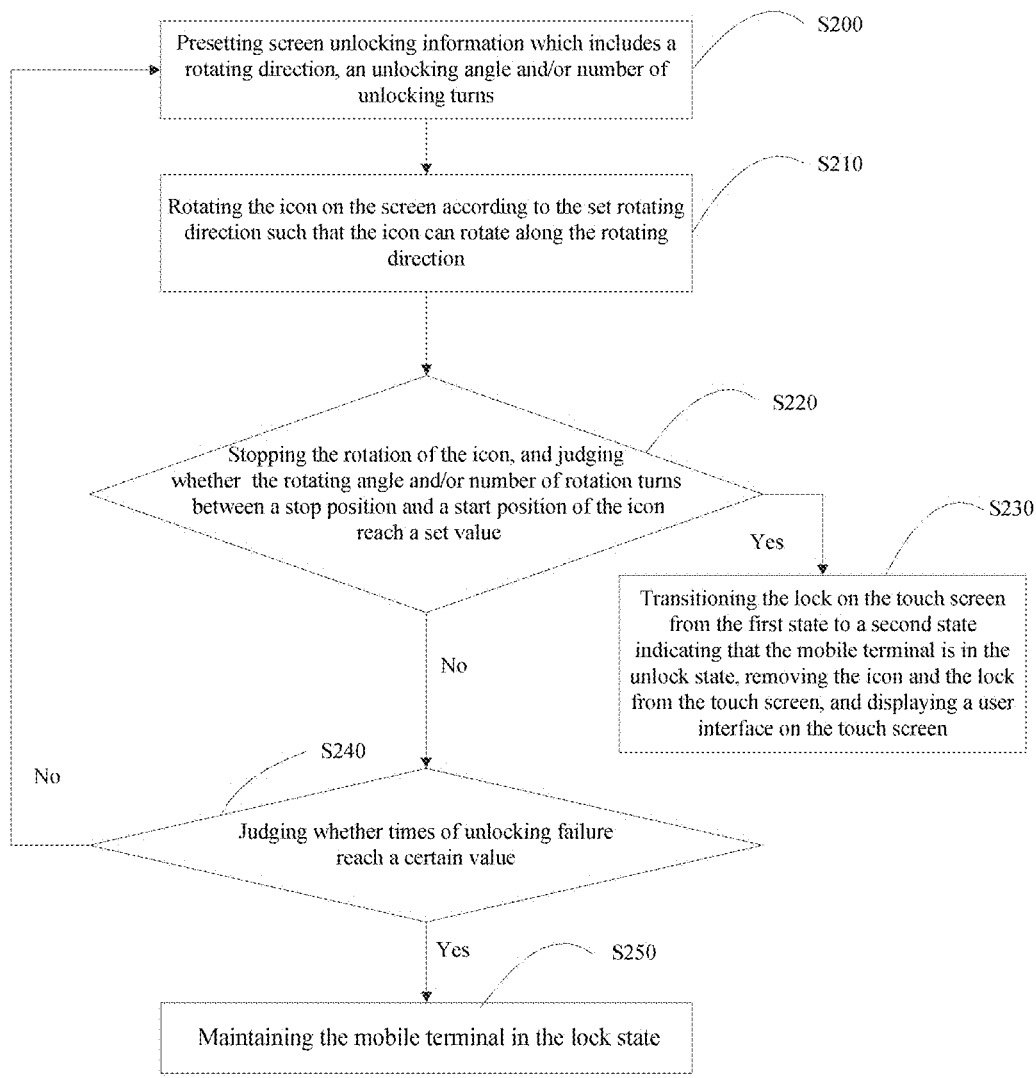
FIG. 6 is a flow chart of a screen unlocking method for a mobile terminal according to a second embodiment of the present disclosure.

FIG. 6 is a flow chart of a screen unlocking method for a mobile terminal according to a second embodiment of the present disclosure. Referring to FIG. 6, a screen unlocking method for a mobile terminal in a second embodiment of the present disclosure includes steps as follows.

Step S200: presetting screen unlocking information which includes a rotating direction, an unlocking angle and/or number of unlocking turns.

A generation rule of a screen locking password is a locking angle plus number of rotation turns of the icon. Fox example, if the locking angle is 180°, the screen locking password is 180° plus 1; if the locking angle is 450 degrees, the screen locking password is 450° plus 2. In step S200, the rotating direction and the unlocking angle can be set according to requirements from different users. In the embodiment of the disclosure, the rotating direction is clockwise, and the unlocking angle can be set to be an integral multiple of 90 degrees such as 90 degrees, 180 degrees, and 270 degrees according to users' needs. If the unlocking angle is N degrees more than 360 degrees, users should make N/360 turns of the icon and then set the position of the N %360-degree angle as the unlocking position. In the embodiment of the disclosure, the default unlocking angle is 90 degrees. In the embodiment of the disclosure, security can be further ensured by setting the number of unlocking turns, for example, the number of unlocking turns is set to be five; when the unlocking angle meets requirements, the number of rotation turns is also required to meet preset requirements, which greatly improves the security. In addition, if unlocking failure reaches a certain number of times, the screen is maintained in the lock state and users may be prevented from unlocking the screen within a certain period. Furthermore, warning messages can be sent to a telephone number associated with the mobile terminal. It can be understood that the present disclosure not only can be applied to the screen unlocking function, but also can be applied to other functions which need unlocking operations, for example, answering a call. Users can set different unlocking information corresponding to different unlocking functions.

Step S210: rotating the icon on the screen according to the rotating direction such that the icon can rotate along the rotating direction.

In step S210, a small lock is displayed in the middle of a status bar which is located at the top of a screen; if the small lock is locked, it indicates that the screen is in a lock state, and if the small lock is unlocked, it indicates that the screen is in an unlock state. A shape, position, and direction of the icon can be set according to requirements from different users, thereby meeting users' personal demands and enriching users' visual effects. In the embodiment of the disclosure, the icon has a key shape and is set in the middle of the screen, an end of the key keeps horizontal and faces rightwards; when the screen is locked, an angle between the end of the key and the horizontal direction is recorded as 0 degree, as specifically shown in FIGS. 3 and 4, in which FIG. 3 is an effect chart showing that a screen of the mobile terminal is in a lock state and FIG. 4 is an effect chart showing rotation of an icon of a mobile terminal of the present disclosure Step S220: stopping the rotation of the icon, and judging whether the rotating angle and/or number of rotation turns between a stop position and a start position of the icon reach a set value, if yes, performing step S230; if not, prompting unlocking failure and performing the step S240.

In the step S220, after a user gesture of rotating the key stops, the rotating angle between the stop position and the start position of the icon is only fixed at an integral multiple of 90 degrees such as 0 degree, 90 degrees, 180 degrees, and 270 degrees. If the rotating angle does not reach a multiple of 90 degrees, the icon rebounds to a closer previous degree or rotates to a closer next degree in the form of animation according to the nearby principle, which is beneficial to improve a sensitivity of the screen unlocking operation and user experience thereof. For example, if the user gesture rotates the key over 78 degrees, the key stops at the 90-degree position finally, and if the user gesture rotates the key over 178 degrees, the key stops at the 180-degree position finally. The animation needs the acceleration effect from gravity sensor.

Step S230: transitioning the lock on the touch screen from the lock state to the open state, removing the lock and the icon from the touch screen, and displaying a user interface on the touch screen, wherein the user interface is not the same as the mobile terminal in a lock state.

Figure 5:
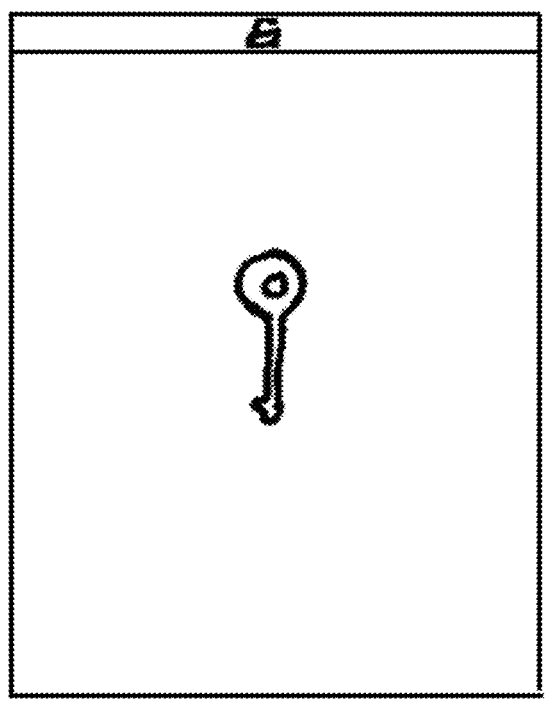
FIG. 5 is an effect chart showing that the screen of the mobile terminal is successfully unlocked.

In step S230, when the screen is locked, the small lock is displayed in the lock state in the middle of the top status bar, as shown from FIG. 1 to FIG. 4; after the screen is successfully unlocked, the small lock is displayed in the open state in the middle of the top status bar, as specifically shown in FIG. 5, which is an effect chart showing that the screen of the mobile terminal is successfully unlocked.

Step S240: judging whether times of unlocking failure reach a certain value, if yes, performing the step S250; and if not, prompting the unlocking failure and repeating step S200.

In step S240, the times of unlocking failure can be set according to users' requirements, for example, the times of unlocking failure can be set 3 or 5.

Step S250, maintaining the mobile terminal in the lock state.

In step S250, if the times of unlocking failure reach a certain value, the screen is locked and users are prevented from unlocking the screen within a certain period; moreover, after the screen is locked, warning messages can be sent to a telephone number associated with the mobile terminal.

Figure 7:
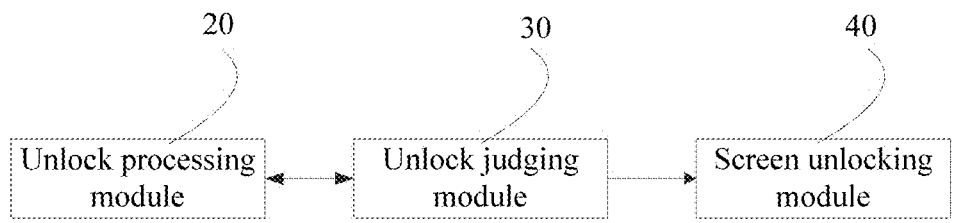
FIG. 7 is a block diagram of a screen unlocking device for a mobile terminal according to a first embodiment of the present disclosure.

The prevent disclosure further provides a screen unlocking device for a mobile terminal. FIG. 7 is a schematic view of a screen unlocking device for a mobile terminal in accordance with a first embodiment of the present disclosure. As shown in FIG. 7, the device includes an unlock processing module 20, an unlock judging module 30, and a screen unlocking module 40.

The unlock processing module 20 is configured for receiving an input event of a user on the touch screen wherein the input event includes a rotating operation on an icon. A small lock is displayed in the middle of a status bar on the top of a screen. If the small lock is locked, it indicates that the screen is in a lock state, and users can unlock the screen by rotating the icon according to the set unlocking information; a shape, position, and direction of the icon and the rotating direction can be set according to requirements from different users, thereby by meeting users' personalized needs and enriching users' visual effects. In the embodiment of the present disclosure, the icon has a key shape and is set in the middle of the screen, an end of the key keeps horizontal and face rightwards, and the rotating direction is clockwise; when the screen is locked, an angle between the end of the key and the horizontal direction is recorded as 0 degree, as specifically shown in FIGS. 3 and 4, in which FIG. 3 is an effect chart showing that a screen of the mobile terminal is in a lock state and FIG. 4 is an effect chart showing rotation of an icon of the screen of the mobile terminal.

In some embodiments, the unlock processing module is further configured for displaying a small lock in a lock state indicating that the mobile terminal is in the lock state in the middle of the top status bar, as shown from FIG. 1 to FIG. 4.

The unlock judging module 30 is configured for detecting whether the rotating angle of the icon equals a unlocking angle preset in a storage system of the mobile terminal. If the rotating angle equals the unlocking angle, the screen is unlocked by the screen unlocking module 40; if the rotating angle does not equal the unlocking angle, rotating information of the icon is received again by the unlock processing module 20. After a user gesture of rotating the key stops, the rotating angle between a stop position and a start position of the icon is only fixed at an integral multiple of 90 degrees such as 0 degree, 90 degrees, 180 degrees, and 270 degrees. If the rotating angle does not reach an integral multiple of 90 degrees, the icon rebounds to a closer previous angle or rotates to a closer next angle in the form of animation, which is beneficial to improve a sensitivity of the screen unlocking operation and user experience thereof. For example, the user gesture rotates the key over 78 degrees, the key stops at the 90-degree position finally, and if the user gesture rotates the key over 178 degrees, the key stops at the 180-degree position finally. The animation needs the acceleration effect from gravity sensor. The unlocking angle can be set to be an integral multiple of 90 degrees such as 90 degrees, 180 degrees, and 270 degrees according to requirements from users. If the unlocking angle is N degrees more than 360 degrees, users need to at first make N/360 turns of the icon and then set the position of the N %360-degree angle as the unlocking position. In the embodiment of the present disclosure, the default unlocking angle is 90 degrees. It can be understood that the prevent disclosure not only can be applied to the screen unlocking function, but also can be applied to other functions which needs unlocking operations, for example, answering a call. Users can set different unlocking information corresponding to different unlocking functions.

The screen unlocking module 40 is configured for transitioning the mobile terminal from the lock state to an unlock state upon the condition that the rotating angle equals the unlocking angle. After the screen is successfully unlocked, the small lock is displayed in an open state in the middle of the top status bar, as specifically shown in FIG. 5, which is an effect chart showing that the screen of the mobile terminal is successfully unlocked.

Figure 8:
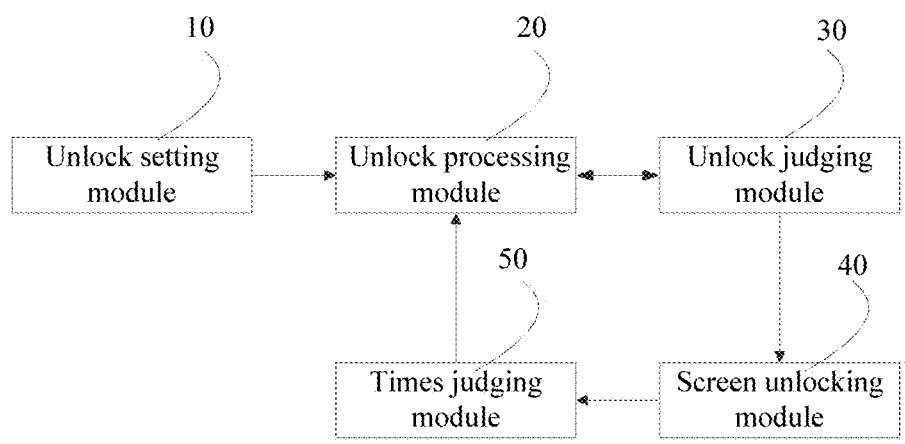
FIG. 8 is a block diagram of a screen unlocking device for a mobile terminal according to a second embodiment of the present disclosure.

FIG. 8 is a schematic view of a screen unlocking device for a mobile terminal according to a second embodiment of the present disclosure. As shown in FIG. 8, the device includes an unlock setting module 10, an unlock processing module 20, the unlock judging module 30, a screen unlocking module 40, and a times judging module 50.

The unlock setting module 10 is configured for presetting screen unlocking information which includes a rotating direction, an unlocking angle, and/or number of unlocking turns. The rotating direction and the unlocking angle can be set according to requirements from different users, and in the embodiment of the present disclosure, the rotating direction is clockwise; the unlocking angle can be set to be an integral multiple of 90 degrees such as 90 degrees, 180 degrees, and 270 degrees. If the unlocking angle is N degrees which is more than 360 degrees, users need to at first make N/360 turns of the icon and then set a position of the N %360-degree angle as the unlocking position. In the embodiment of the present disclosure, the default unlocking angle is 90 degrees. Furthermore, security can be further ensured by setting the number of unlocking turns, for example, the number of unlocking turns can be five; when the unlocking angle meets requirements, the number of rotation turns is also required to meet preset requirements, which greatly improves the security. In addition, if unlocking failure reaches a certain number of times, the screen is maintained in the lock state and users may be prevented from unlocking the screen within a certain period. Furthermore, warning messages can be sent to a telephone number associated with the mobile terminal. It can be understood that the present disclosure not only can be applied to the screen unlocking function, but also can be applied to other functions which need unlocking operations, for example, answering a call. Users can set different unlocking information corresponding to different unlocking functions.

The unlock processing module 20 is configured for rotating the icon on the screen according to the rotating direction such that the icon can rotate along the rotating direction. A small lock is displayed in the middle of a status bar which is located at the top of the screen; if the small lock is locked, it indicates that the screen is in a lock state, and if the small lock is unlocked, it indicates that the screen is in an unlock state. A shape, position, and direction of the icon can be set according to requirements from different users, thereby meeting users' personal needs and enriching users' visual effects. In the embodiment of the disclosure, the icon has a key shape and is set in the middle of the screen, and an end of the key keeps horizontal and faces rightwards; when the screen is locked, an angle between the end of the key and the horizontal direction is recorded as 0 degree, as specifically shown in FIGS. 3 and 4, in which FIG. 3 is an effect chart showing that a screen of the mobile terminal is in a lock state and FIG. 4 is an effect chart showing rotation of an icon of a mobile terminal of the present disclosure.

The unlock judging module 30 is configured for judging whether the rotating angle and/or number of rotation turns between a stop position and a start position of the icon reaches the set value when the icon stops rotating; if yes, the screen is unlocked by the screen unlocking module 40, if not, the icon is rotated again by the unlock processing module 20. After a user gesture of rotating the key stops, the rotating angle between the stop position and the start position of the icon is only fixed at an integral multiple of 90 degrees such as 0 degree, 90 degrees, 180 degrees, and 270 degrees. If the rotating angle does not reach an integral multiple of 90 degrees, the icon rebounds to a closer previous angle or rotates to a closer next angle in the form of animation, which is beneficial to improve a sensitivity of the screen unlocking operation and user experience thereof. For example, if the user gesture rotates the key over 78 degrees, the key stops at the 90-degree position finally, and if the user gesture rotates the key over 178 degrees, the key stops at the 180-degree position finally. Wherein, the animation needs the acceleration effect from gravity sensor.

The screen unlocking module 40 is configured for transitioning the mobile terminal from the lock state to an unlock state upon the condition that the rotating angle equals the unlocking angle. In detail, the screen unlocking module is configured for transitioning the lock on the touch screen from the lock state to an open state indicating that the mobile terminal is in the unlock state, removing the lock and the icon from the touch screen, and displaying a user interface on the touch screen, the user interface not the same as the mobile terminal in a lock state. After the mobile terminal is successfully unlocked, the small lock is displayed in the open state in the middle of the top status bar, as specifically shown in FIG. 5, which is an effect chart showing that the screen of the mobile terminal is successfully unlocked.

The times judging module 50 is configured for judging whether times of unlocking failure reach a certain value; if yes, the times judging module 50 maintaining the mobile terminal in the lock state, if not, the times judging module 50 prompts the unlocking failure and the screen is unlocked again by the screen unlocking module 40. In addition, warning messages can be sent to a telephone number associated with the mobile terminal after the screen is locked.

The screen unlocking method and device provided in the present disclosure can set the shape, position, and direction of the icon according to different users' requirements, which meets users' personalized needs and enriches users' visual effects; in addition, the unlocking angle is set by users, when the rotating angle of the icon does not equal the unlocking angle, the icon rebounds to a closer previous angle or rotate to a closer next angle in the form of animation, which is beneficial to improve a sensitivity of the screen unlocking operation and to improve user experience.

Furthermore, the present disclosure further provides a computer-readable storage medium which stores instructions which can be executed by the computer and modules, for example, instructions/modules for performing the screen unlocking method in the terminal (for example, the unlock setting module 10, the unlock processing module 20, the unlock judging module 30, the screen unlocking module 40, and the times judging module 50 of the screen unlocking device for a mobile terminal). The instructions and modules in the terminal are executed by at least one processor in the terminal the above screen unlocking method for a terminal, thereby realizing the above screen unlocking method for a mobile terminal. The above computer-readable storage medium can be a non-volatile storage such as an optical disk, a hard disk, or a flash memory.

The foregoing descriptions are only preferred embodiments of the present invention and are not intended to limit the present invention. Any modification, equivalent replacement and improvement made under the spirit and principle of the present invention should be included in the protection scope thereof.

What is claimed is:

1. A computer-implemented method for unlocking a touch screen of a mobile terminal, the method comprising:
    at the mobile terminal having one or more processors, a gravity sensor and memory for storing program modules to be executed by the processors:
    providing an icon on the touch screen that indicates the mobile terminal is in a lock state;
    receiving an input event of a user on the touch screen, the input event comprising a rotating operation on the icon;
    detecting whether a rotating angle of the icon equals a unlocking angle preset in a storage system of the mobile terminal; and
    transitioning the mobile terminal from the lock state to an unlock state upon the condition that the rotating angle equals the unlocking angle;
    wherein when the rotating angle between a stop position and a start position of the icon does not reach the unlocking angle, the icon rebounds to a closer previous degree or rotates to a closer next degree in the form of animation, wherein the animation comprises acceleration effect generated from the gravity sensor.

2. The method of claim 1, further comprising:
    displaying a lock in a first state on the touch screen indicating that the mobile terminal is in the lock state.

3. The method of claim 2, wherein transitioning the mobile terminal from the lock state to an unlock state comprises:
    transitioning the lock on the touch screen from the first state to a second state indicating that the mobile terminal is in the unlock state;

removing the icon and the lock from the touch screen; and displaying a user interface on the touch screen, the user interface not the same as the mobile terminal in a lock state.

4. The method of claim 1, wherein before receiving an input event of a user on the touch screen, the method comprises:

presetting unlocking information of the mobile terminal;

storing the unlocking information in the storage system of the mobile terminal;

the unlocking information comprising a rotating direction, an unlocking angle and/or number of unlocking turns, wherein the unlocking angle is set to be an arbitrary integral multiple of 90 degrees.

5. The method of claim 4, wherein before detecting whether a rotating angle of the icon equals an unlocking angle, the method comprises:

detecting whether number of rotation turns of rotating the icon reaches the number of unlocking turns preset in a storage system of the mobile terminal.

6. The method of claim 4, wherein before receiving an input event of a user on the touch screen, the method comprises:

rotating the icon indicated on the touch screen according to the preset rotating direction such that the icon can rotate along the rotating direction.

7. The method of either claim 1, wherein a shape, position, and direction of the icon can be preset according to requirements from different users.

8. The method of claim 1, wherein the closer previous degree or the closer next degree is an integral multiple of 90 degrees.

9. The method of claim 1, further comprising:

when the rotating angle of the icon does not reach the unlocking angle, prompting unlocking failure and judging whether times of the unlocking failure reach a certain value, when yes, maintaining the mobile terminal in the lock state; when not, receiving an input event of a user on the touch screen for unlocking the touch screen again.

10. A screen unlocking device for a mobile terminal, comprising:

an unlock processing module configured for receiving an input event of a user on the touch screen, the input event comprising a rotating operation on the icon;

an unlock judging module configured for detecting whether a rotating angle of the icon equals a unlocking angle preset in a storage system of the mobile terminal; and a screen unlocking module configured for transitioning the mobile terminal from the lock state to an unlock state upon the condition that the rotating angle equals the unlocking angle;

wherein the device further comprises a gravity sensor, and when the rotating angle between a stop position and a start position of the icon does not reach the unlocking angle, the icon rebounds to a closer previous degree or rotates to a closer next degree in the form of animation, wherein the animation comprises acceleration effect generated from the gravity sensor.

11. The device of claim 10, wherein the unlock processing module is further configured for displaying a lock in a first state on the touch screen indicating that the mobile terminal is in the lock state.

12. The device of claim 11, wherein the screen unlocking module is configured for: transitioning the lock on the touch screen from the first state to a second state indicating that the mobile terminal is in the unlock state;

removing the lock and the icon from the touch screen; and displaying a user interface on the touch screen, the user interface not the same as the mobile terminal in a lock state.

13. The device of claim 10, wherein the device further comprises an unlock setting module configured for presetting unlocking information of the mobile terminal and storing the unlocking information in the storage system of the mobile terminal; the unlocking information comprises a rotating direction, an unlocking angle and/or number of unlocking turns, wherein the unlocking angle is set to be an arbitrary integral multiple of 90 degrees.

14. The device of claim 13, wherein the unlock processing module is further configured for rotating the icon indicated on the touch screen according to the preset rotating direction such that the icon can rotate along the rotating direction.

15. The device of claim 10, wherein a shape, location and direction of the icon can be preset according to requirements from different users.

16. The device of claim 10, further comprising a times judging module configured for judging whether times of unlocking failure reach a certain value, when yes, maintaining the mobile terminal in the lock state; when not, the times judging module prompts the unlocking failure and the screen is unlocked again by the unlock processing module.

\* \* \* \* \*